United States Patent
Wikman et al.

(10) Patent No.: US 6,644,705 B2
(45) Date of Patent: Nov. 11, 2003

(54) INTERIOR SYSTEM FOR A MOTOR VEHICLE

(75) Inventors: Hans Wikman, Askim (SE); Leo Kullman, Mullsjo (SE); Lennart Liedberg, Gothenburg (SE); Tord Forsgren, Vastra Frolunda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,017

(22) Filed: Sep. 11, 2002

(65) Prior Publication Data

US 2003/0098589 A1 May 29, 2003

Related U.S. Application Data

(60) Provisional application No. 60/319,013, filed on Nov. 28, 2001.

(51) Int. Cl.[7] .............................. B60R 11/06; B60N 3/12
(52) U.S. Cl. .................. 296/24.1; 296/37.8; 296/37.15
(58) Field of Search ........................ 296/24.1, 37.1, 296/37.8, 37.14–37.16, 65.01, 65.13, 75; 224/400, 487, 275, 483, 484

(56) References Cited

U.S. PATENT DOCUMENTS

| | | | | |
|---|---|---|---|---|
| 1,879,418 A | * | 9/1932 | Myatt | 296/75 |
| 3,059,960 A | * | 10/1962 | Komorowski et al. | 296/75 |
| 5,520,313 A | * | 5/1996 | Toshihide | 296/37.15 |
| 5,609,382 A | * | 3/1997 | Schmid et al. | 296/37.8 |
| 5,951,084 A | * | 9/1999 | Okazaki et al. | 296/37.16 |
| 6,203,088 B1 | * | 3/2001 | Fernandez et al. | 296/37.8 |
| 6,264,261 B1 | * | 7/2001 | Krafcik | 296/37.8 |
| 6,318,785 B1 | * | 11/2001 | Tousignant | 296/75 |
| 6,338,429 B1 | * | 1/2002 | Pesce | 296/37.8 |
| 6,425,619 B2 | * | 7/2002 | Ney | 296/65.15 |
| 6,488,327 B1 | * | 12/2002 | Pearse et al. | 296/65.05 |

FOREIGN PATENT DOCUMENTS

| | | | | |
|---|---|---|---|---|
| DE | 4215136 | * | 11/1993 | 296/37.8 |
| JP | 58180339 | * | 10/1983 | 296/37.8 |

\* cited by examiner

*Primary Examiner*—Stephen T. Gordon
*Assistant Examiner*—G Blankenship
(74) *Attorney, Agent, or Firm*—Mark S. Sparschu

(57) ABSTRACT

An interior system for a motor vehicle comprises two front seats and a rear seat disposed rearwardly of the front seats and adjustable through a range of positions including a forwardmost and a rearwardmost position. The system also includes a first console disposed between the two front seats, the first console having a substantially flat portion located lower than the rear seat and in general lateral alignment with the rear seat, the flat portion further located proximate the rear seat when the rear seat is in its forwardmost position. The first console further comprises attachment provisions for attaching a second console to the first console at least in part upon the substantially flat portion. In another aspect, an interior system for a motor vehicle comprises two front seats, a first console disposed between the two front seats and a second console removably attached to the first console. The system further includes a rear seat disposed rearward of the front seat and adjustable through a range of positions including a forwardmost and a rearwardmost position. The first console has a substantially flat portion suitably disposed and sized to act as a footrest for a person sitting in the rear seat with the rear seat in at least some of the range of positions and the second console removed from the first console.

15 Claims, 5 Drawing Sheets

INTERIOR SYSTEM FOR A MOTOR VEHICLE

BACKGROUND OF INVENTION

1. Field of the Invention

The present invention relates to interior systems for motor vehicles.

2. Background of the Related Art

In a motor vehicle, comfort and convenience for all people in the vehicle are important. Part of "comfort and convenience" for small children includes the ability to be near their parents. However, for small children seated in the second row of seats in the vehicle, they have not heretofore been able to sit near their parents if their parents are in the front row of seats. Thus, a solution to this issue would improve the comfort and convenience aspects of family travel in a motor vehicle. At the same time, to the extent that the solution to this issue "sub-optimizes" the interior packaging of the vehicle for families without small children, the solution should also be flexible enough to meet the needs of such other families.

SUMMARY OF INVENTION

It is therefore an object of the present invention to provide an interior system for a motor vehicle which allows a person seated in the second row of seats to be located near the people seated in the front seats.

It is a further object of the present invention for the interior system to be flexible enough not to be permanently sub-optimized for families who do not require the ability for a person seated in the second row of seats to be located near the people seated in the front seats.

The present invention provides an interior system for a motor vehicle, the motor vehicle defining a forward and a rearward longitudinal direction. The system comprises two front seats and a rear seat disposed rearwardly of the front seats and adjustable through a range of positions including a forwardmost and a rearwardmost position. The system also includes a first console disposed between the two front seats, the first console having a substantially flat portion located lower than the rear seat and in general lateral alignment with the rear seat, the flat portion further located proximate the rear seat when the rear seat is in its forwardmost position. The first console further comprises attachment provisions for attaching a second console to the first console at least in part upon the substantially flat portion.

The present invention also provides an interior system for a motor vehicle, the motor vehicle defining a forward and a rearward longitudinal direction. The system comprises two front seats, a first console disposed between the two front seats and a second console removably attached to the first console. The system further includes a rear seat disposed rearward of the front seat and adjustable through a range of positions including a forwardmost and a rearwardmost position. The first console has a substantially flat portion suitably disposed and sized to act as a footrest for a person sitting in the rear seat with the rear seat in at least one position of the range of positions and the second console removed from the first console.

DETAILED DESCRIPTION

Figure 1:
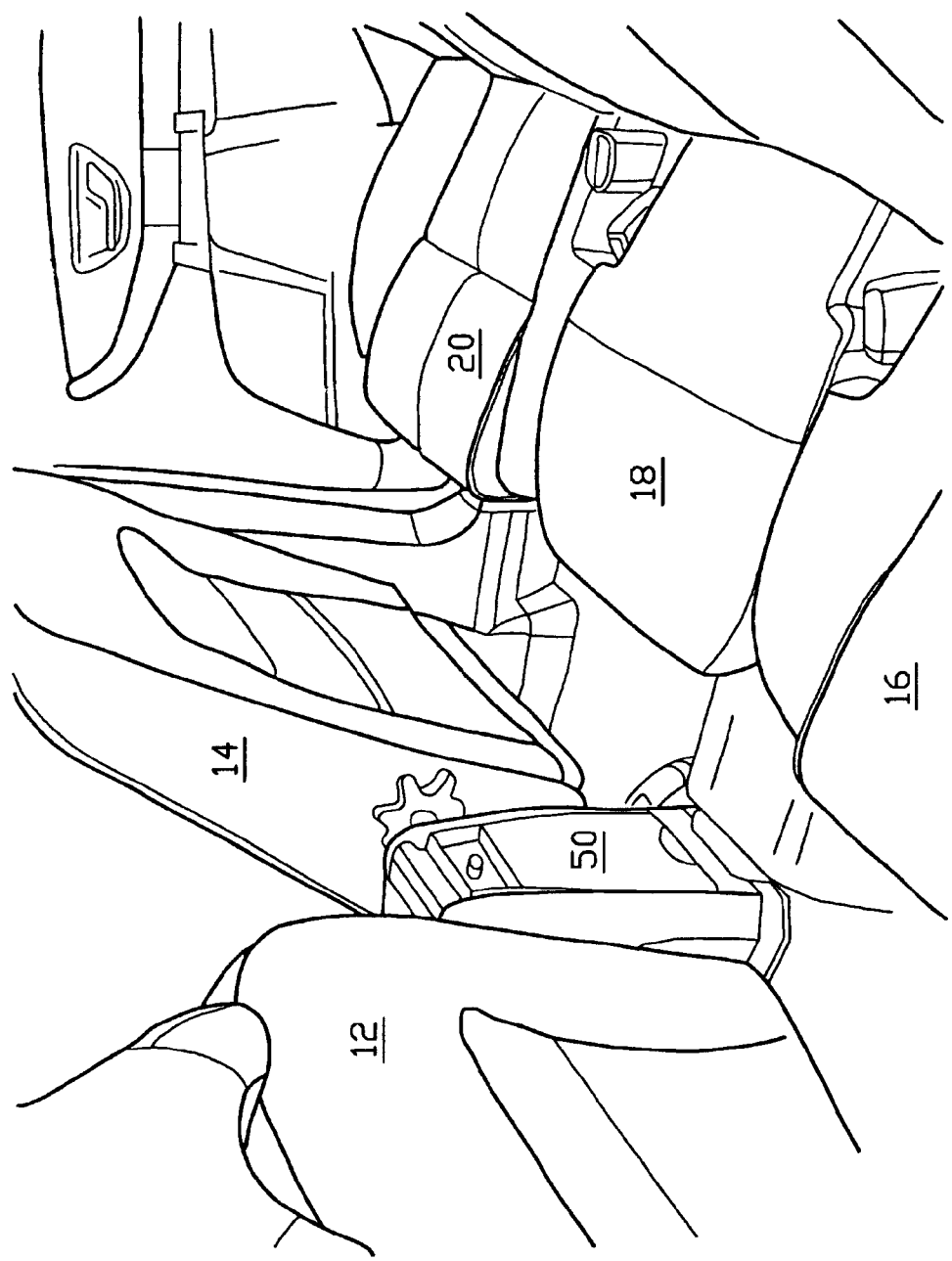
FIG. 1 illustrates part of the interior of a motor vehicle with center-second row seat 18 in the rearmost position and console 50 in place.

Refer first to FIG. 1. The interior of a motor vehicle such as a car or sport-utility vehicle includes front seats 12, 14 arranged in a first row in the vehicle. Further, the vehicle includes second row seats 16, 18 and 20 arranged in a second row in the vehicle, the second row located behind the first row. Further rows of seats can be located behind the second row, depending on the exact seating configuration in the vehicle.

Figure 3:
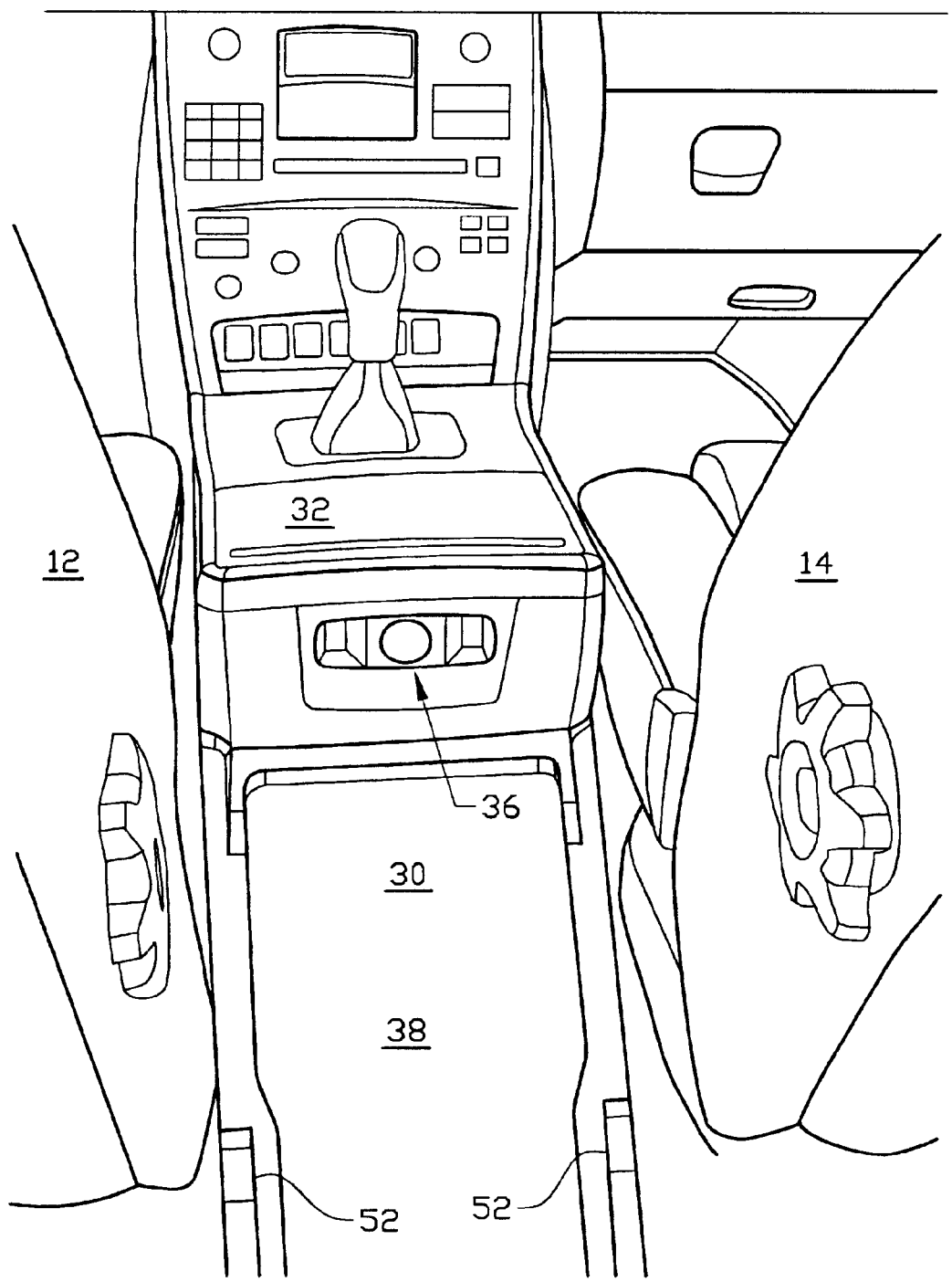
FIG. 3 is a view between the front seats of the vehicle with console 50 removed.
Figure 4:
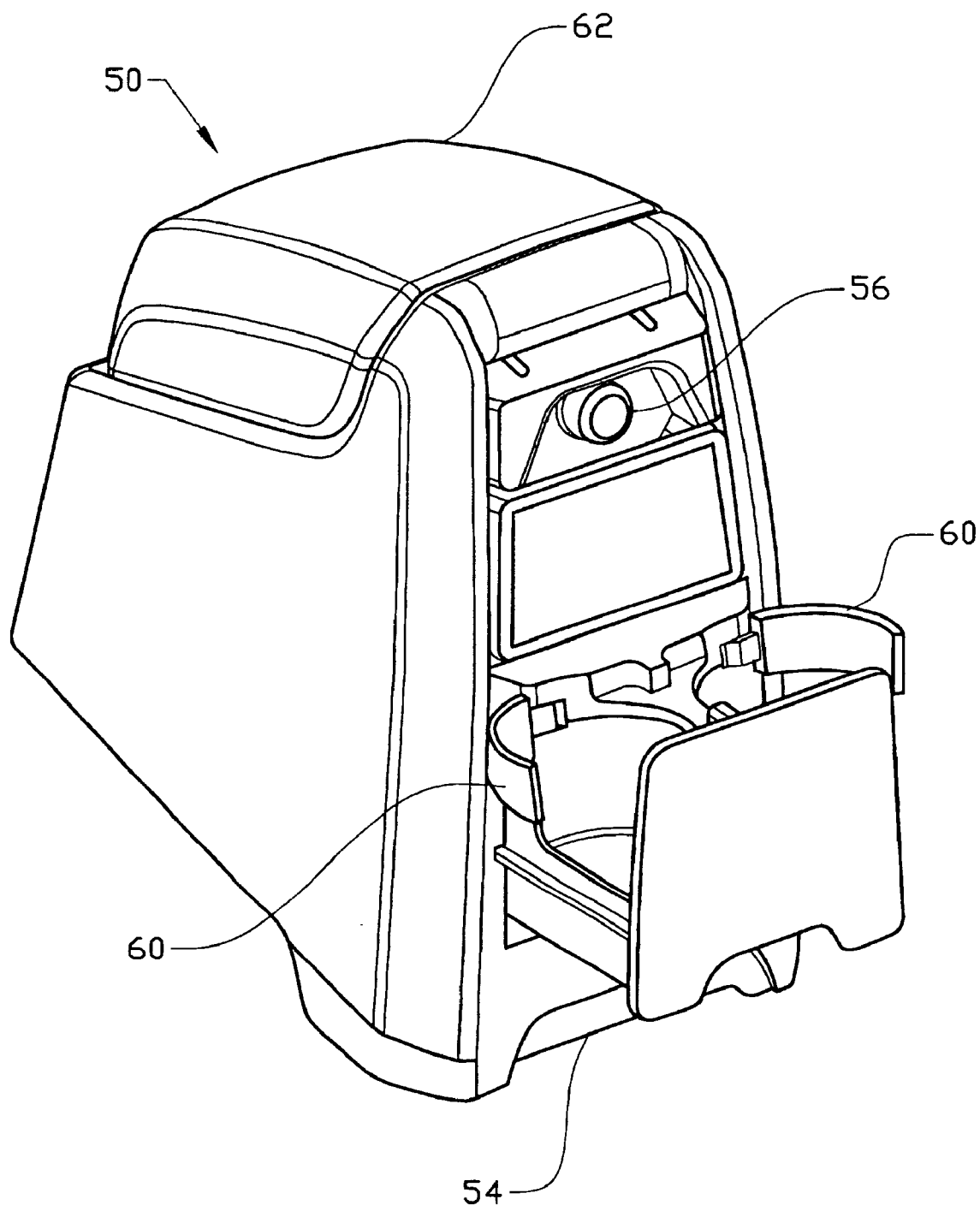
FIG. 4 is a perspective view of console 50.
Figure 5:
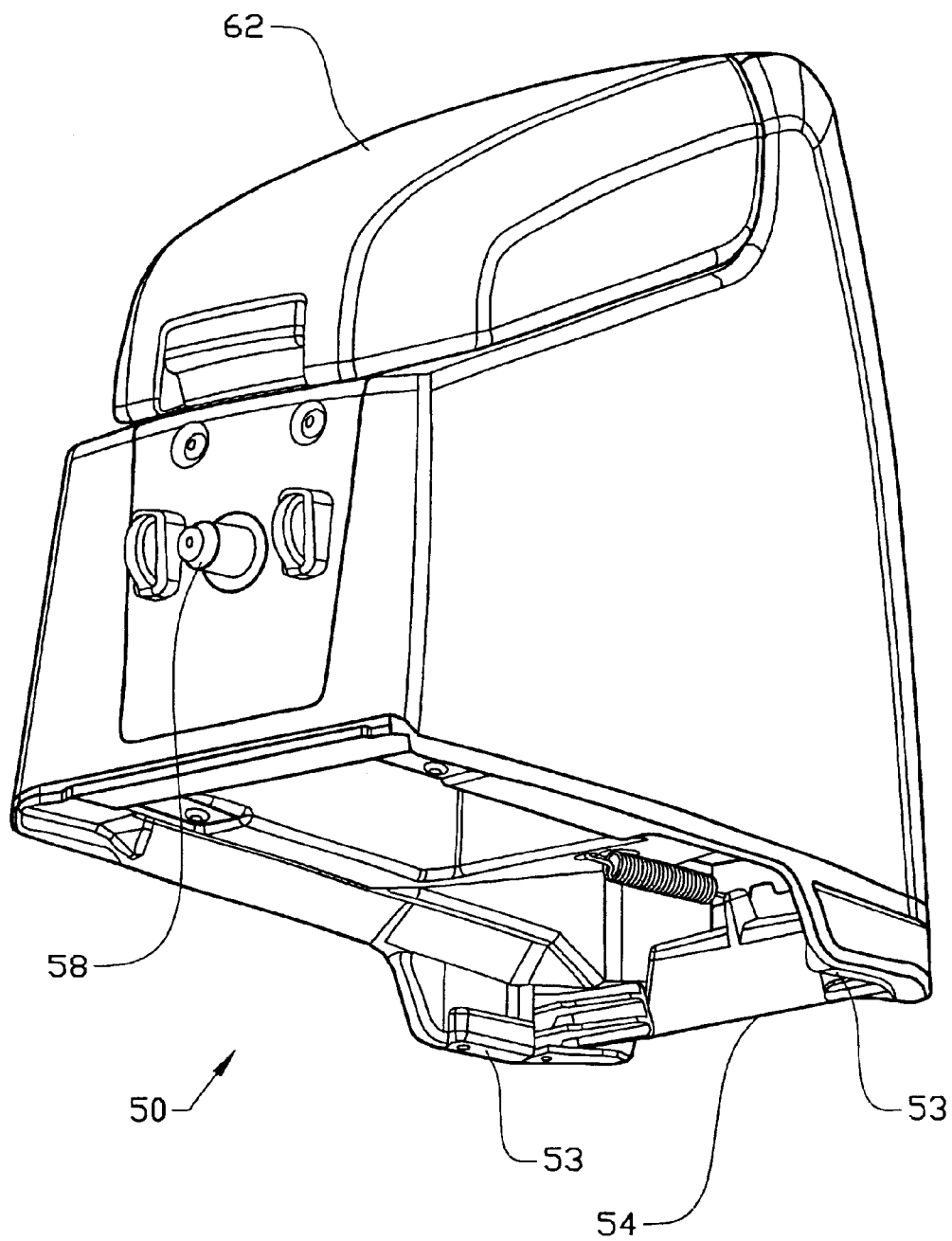
FIG. 5 is another perspective view of console 50.

Refer now additionally to FIG. 3. Mounted between front seats 12, 14 is a first or base console 30. First console 30 is preferably fixedly attached to the vehicle such as with screws or other attachment means which are not intended to be removed by the owner of the vehicle, except perhaps during repair of the interior of the vehicle. First console 30 includes comfort and convenience items which would be included in a typical motor vehicle console, including an access door 32 to access interior conveniences of the vehicle such as cupholder(s), coin holder(s), ashtray(s) and the like, and a 12-volt electrical power outlet 36. Electrical power outlet 36 is adapted for selectable connection and disconnection of any of a number of electrical devices or appliances, such as audio devices, televisions, coffee cup heaters, and others. Also included at the rear of first console 30 is a flat footrest portion 38, which is preferably covered with carpeting, other textile material, padding or other material which makes footrest portion 38 comfortable on which to place a person's feet. With first console 30 mounted in place in the vehicle, footrest portion 38 is located at a level lower than center rear seat 18, as would be expected for footrest portion 38 to be effective as a footrest for a person (especially a child) sitting in center rear seat 18.

Figure 2:
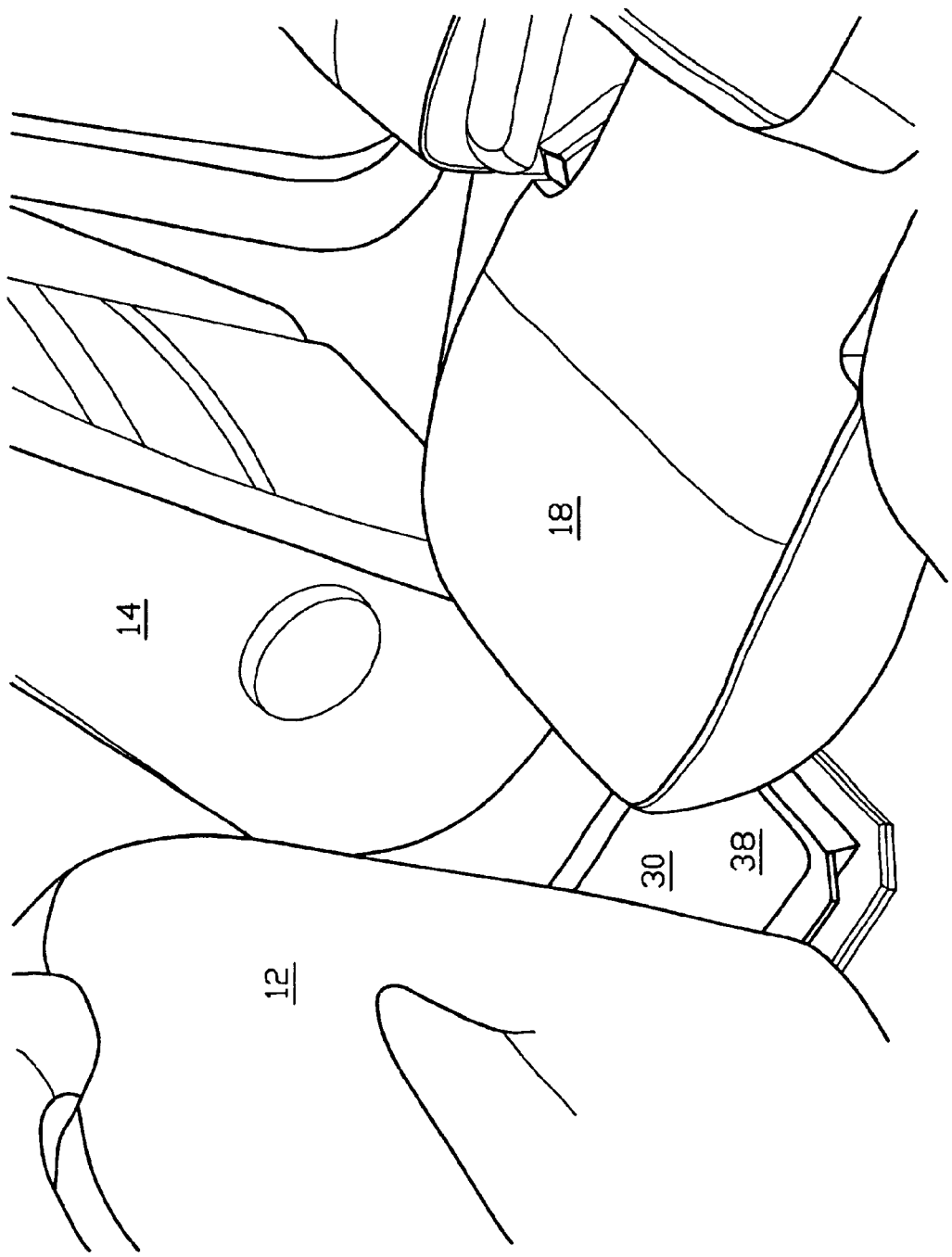
FIG. 2 illustrates part of the interior of the motor vehicle with center-second row seat 18 in the forwardmost position and console 50 removed.

Refer now additionally to FIG. 2. Center rear seat 18 is adjustable forward and rearward, so that a person (especially a child) sitting in center rear seat 18 can have center rear seat 18 adjusted forward to allow the person's feet to rest upon footrest portion 38. Preferably, center rear seat is adjustable forward and rearward independently of the forward/rearward position of the other rear seats 16, 20. This will allow the person using footrest portion 38 to have her seat adjusted sufficiently far forward to use footrest portion 38 without requiring similar forward positions for seats 16, 20. Also preferably, center rear seat 18 has an integrated child seat, as is provided in several vehicle models in the motor vehicle market.

If no person in the center rear seat 18 desires to use footrest portion 38, second console 50 can remain in the vehicle. Center console 50 is removably attachable to first console 30 substantially above footrest portion 38. Latching detents 52 on first console 30 cooperate with tongues 53 on the underside of second console 50 in order for second console 50 to be attached to first console 30. A spring-loaded handle 54 on the lower portion of the rear of second console 50 is used to release tongues 53 on second console 50 when removal of second console 50 from first console 30 is desired. Of course, any other suitable readily-removable way to affix second console 50 to first console 30 can be used without departing from the spirit of the present invention.

Second console 50 includes a 12-volt power outlet 56 preferably on its rear surface. Electrical power for power outlet 56 is provided through coupling of plug 58 on second console 50 into power outlet 36 of first console 30 when second console 50 is attached to first console 30. Suitable conductors (not shown for the sake of brevity) within second console 50 electrically couple plug 58 to power outlet 56.

Second console 50 includes features such as cupholders 60 and armrest 62. Beneath armrest 62 is a storage compartment within second console 50.

What is claimed is:

1. An interior system for a motor vehicle, said motor vehicle defining a forward and a rearward longitudinal direction, said system comprising:
   two front seats;
   a rear seat disposed rearwardly of said front seats and adjustable through a range of positions including a forwardmost and a rearwardmost position;
   a first console disposed between said two front seats, said console having a substantially flat portion located lower than said rear seat and in general lateral alignment with said rear seat, said flat portion further located proximate said rear seat when said rear seat is in said forwardmost position;
   said first console further comprising attachment provisions for removeably attaching a second console to said first console at least in part upon said substantially flat portion;
   further comprising a second console removeably attached to said attachment provisions; wherein
   said first console further comprises a first electrical power outlet for selectable connection of an electrical device;
   said second console includes a second electrical power output; and
   said second console includes a single, substantially cylindrical electrical plug in electrical communication with said second electrical power outlet and further physically and electrically engaged with said first electrical tower outlet when said second console is attached to said first console.

2. An interior system as recited in claim 1, wherein said substantially flat portion is padded.

3. An interior system as recited in claim 1, wherein said substantially flat portion is covered with carpeting.

4. An interior system as recited in claim 1, wherein said first console includes an access door for access to an interior convenience feature of the vehicle.

5. An interior system as recited in claim 4, wherein said second console further comprises at least one cupholder.

6. An interior system as recited in claim 1, wherein said second console comprises an armrest.

7. An interior system as recited in claim 1, further comprising a second console removeably attached to said attachment provisions.

8. An interior system for a motor vehicle, said motor vehicle defining a forward and a rearward longitudinal direction, said system comprising:
   two front seats;
   a first console disposed between said two front seats,
   a second console removably attached to said first console;
   a rear seat disposed rearward of said front seat and adjustable through a range of positions including a forwardmost and a rearwardmost position;
   said first console having a substantially flat portion suitably disposed and sized to act as a footrest for a person sitting in said rear seat with said rear seat in at least one position of said range of positions and said second console removed from said first console; wherein
   said first console includes a first electrical power outlet for selectable connection of an electrical device;
   said second console includes a single, substantially cylindrical electrical connector adapted for mating with said first electrical power outlet when said second console is attached to said first console; and
   said second console includes a second electrical power outlet in electrical communication with said electrical connector and energized when said electrical connector is mated with said first electrical cower outlet.

9. An interior system as recited in claim 8, wherein said substantially flat portion is padded.

10. An interior system as recited in claim 8, wherein said substantially flat portion is covered with carpeting.

11. An interior system as recited in claim 10, wherein said second console includes an armrest disposed between said front seats.

12. An interior system as recited in claim 11, wherein said second console includes at least one cupholder.

13. An interior system as recited in claim 8, wherein said first console includes an access door for access to an interior convenience feature of the vehicle.

14. An interior system as recited in claim 9, wherein:
   said rear seat is located in a row of seats located rearward of said two front seats;
   said rear seat is located in substantial lateral alignment with said first console; and
   said rear seat is forwardly and rearwardly adjustable independently of the forward and rearward positions of the remainder of seats in said row of seats.

15. An interior system as recited in claim 10, wherein:
   said rear seat is located in a row of seats located rearward of said two front seats;
   said rear seat is located in substantial lateral alignment with said first console; and
   said rear seat is forwardly and rearwardly adjustable independently of the forward and rearward positions of the remainder of seats in said row of seats.

* * * * *